United States Patent
Dong et al.

(10) Patent No.: US 10,572,818 B2
(45) Date of Patent: *Feb. 25, 2020

(54) HORIZONTAL DECISION TREE LEARNING FROM VERY HIGH RATE DATA STREAMS WITH HORIZONTAL PARALLEL CONFLICT RESOLUTION

(71) Applicant: International Business Machines Corporation, Armonk, NY (US)

(72) Inventors: Wei Shan Dong, Beijing (CN); Peng Gao, Beijing (CN); Guo Qiang Hu, Shanghai (CN); Chang Sheng Li, Beijing (CN); Xu Liang Li, Beijing (CN); Chun Yang Ma, Beijing (CN); Zhi Wang, Shenyang (CN); Xin Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 809 days.

This patent is subject to a terminal disclaimer.

(21) Appl. No.: 14/727,993

(22) Filed: Jun. 2, 2015

(65) Prior Publication Data

US 2016/0358095 A1    Dec. 8, 2016

(51) Int. Cl.
*G06N 20/00*        (2019.01)
*G06N 5/04*         (2006.01)

(52) U.S. Cl.
CPC ............ *G06N 20/00* (2019.01); *G06N 5/045* (2013.01)

(58) Field of Classification Search
CPC ...... G06N 5/045; G06N 99/005; G06N 20/00; G06F 17/30371; G06F 17/30572; G06F 8/35

(Continued)

(56) References Cited

U.S. PATENT DOCUMENTS 8,543,517 B2    9/2013   Shotton et al.
8,762,369 B2    6/2014   Macho et al.
(Continued)

FOREIGN PATENT DOCUMENTS

JP       5254700 B2    8/2013

OTHER PUBLICATIONS

Hall et al. Combining Decision Trees Learned in Parallel. Distributed Data Mining Workshop at International Conference of Knowledge Discovery and Data Mining, 1998 (Year: 1998).*

(Continued)

*Primary Examiner* — Alexey Shmatov
*Assistant Examiner* — Robert Bejcek, II
(74) *Attorney, Agent, or Firm* — Stephen R. Tkacs; Stephen J. Walder, Jr; Joseph Petrokaitis (57) ABSTRACT

A mechanism is provided in a data processing system for distributed tree learning. A source processing instance distributes data record instances to a plurality of model update processing items. The plurality of model update processing items determine candidate leaf splitting actions in a decision tree in parallel based on the data record instances. The plurality of model update processing items send the candidate leaf splitting actions to a plurality of conflict resolve processing items. The plurality of conflict resolve processing items identifies conflict leaf splitting actions. The plurality of conflict resolve processing items applies tree structure changes to the decision tree in the plurality of model update processing items.

20 Claims, 5 Drawing Sheets

(58) Field of Classification Search
USPC .......................................................... 706/14
See application file for complete search history.

(56) References Cited

U.S. PATENT DOCUMENTS

| | | | |
|---|---|---|---|
| 8,849,790 B2 | 9/2014 | Bellare et al. | |
| 2003/0061213 A1* | 3/2003 | Yu | G06F 17/30705 |
| 2003/0061228 A1* | 3/2003 | Kamath | G06F 7/24 |
| 2011/0307423 A1* | 12/2011 | Shotton | G06K 9/6282 706/12 |
| 2013/0044924 A1 | 2/2013 | Spencer | |
| 2014/0249875 A1* | 9/2014 | Junker | G06Q 10/06 705/7.11 |

OTHER PUBLICATIONS

"Introducing SAMOA, an Open Source Platform for Mining Big Data Streams", Yahoo Engineering, http://yahooeng.tumblr.com/post/65453012905/introducing-samoa-an-open-source-platform-for, downloaded from the internet on Mar. 17, 2015, 8 pages.

"MOA (Massive Online Analysis)", http://moa.cms.waikato.ac.nz/, downloaded from the internet on Mar. 18, 2015, 5 pages.

Bekkerman, Ron et al., "Scaling Up Machine Learning: Parallel and Distributed Approaches", The 17th ACM SIGKDD Conference on Knowledge Discovery and Data Mining (KDD 2011), San Diego, CA, Aug. 21-24, 2011, 86 pages.

Ben-Haim, Yael et al., "A Streaming Parallel Decision Tree Algorithm", Journal of Machine Learning Research, Feb. 2010, 24 pages.

Mena-Torres, Dayrelis et al., "A Similarity-Based Approach for Data Stream Classification", Expert Systems with Applications vol. 41, Issue 9, Jul. 2014, 21 pages.

Xiao, Han, "Towards Parallel and Distributed Computing in Large-Scale Data Mining: A Survey", Technical University of Munich, Apr. 8, 2010, 30 pages.

List of IBM Patents or Patent Applications Treated as Related (Appendix P), 2 pages.

\* cited by examiner

```
HoeffdingTreeInduction(E, HT)
Input: E is a training instance
Input: HT is the current state of the decision tree
1:   Use HT to sort E into a leaf l
2:   Update sufficient statistic in l
3:   Increment the number of instances seen at l (which is n_l)
4:   if n_l mod n_min = 0 and not all instances seen at l belong to the
     same class then
5:       For each attribute, compute $\overline{G_l}(X_i)$
6:       Find $X_a$, which is the attribute with highest $\overline{G_l}$
7:       Find $X_b$, which is the attribute with second highest $\overline{G_l}$
8:       Compute Hoeffding bound $\varepsilon = \sqrt{\dfrac{R^2 \ln(1/\delta)}{2n_l}}$
9:       if $X_a \neq X_\varnothing$ and $(G_l(X_a) - G_l(X_b)) > \varepsilon$ or $\varepsilon < \tau$ ) then
10:          Replace l with a split-node on $X_a$
11:          for all branches of the split do
12:              Add a new leaf with derived sufficient statistic from the split node
13:          end for
14:      end if
15:  end if
```

MUPI A

FIG. 7C

MUPI B

FIG. 7D

MUPI C

HORIZONTAL DECISION TREE LEARNING FROM VERY HIGH RATE DATA STREAMS WITH HORIZONTAL PARALLEL CONFLICT RESOLUTION

BACKGROUND

The present application relates generally to an improved data processing apparatus and method and more specifically to mechanisms for enabling horizontal decision tree learning from extremely high rate data streams.

Big data is a term for data sets so large or complex that traditional data processing applications are inadequate. Challenges include analysis, capture, curation, search, sharing, storage, transfer, visualization, and information privacy. The term often refers simply to the use of predictive analytics or other certain advanced methods to extract value from data, and seldom to a particular size of data set.

Stream computing is a critical topic of big data. Stream computing is affected by the velocity, volume, veracity, and variety of data. Stream computing applications must address low latency of processing, high speed of data flow, fine grained data granularity, and potentially unlimited data size. Scalability plays a key role in stream computing systems. Scalability involves the capability of distributed computing and parallelism.

InfoSphere® Streams is a big data and stream computing system by International Business Machines Corporation. InfoSphere® Streams is an advanced analytic platform that allows user-developed applications to quickly ingest, analyze and correlate information as it arrives from thousands of real-time sources. The solution can handle very high data throughput rates, up to millions of events or messages per second. The Internet of Things (IoT) is the network of physical objects or "things" embedded with electronics, software, sensors, and connectivity to enable it to achieve greater value and service by exchanging data with the manufacturer, operator, other connected devices, or the cloud. Each thing is uniquely identifiable through its embedded computing system but is able to interoperate within the existing Internet infrastructure. IoT produces a large amount of data to be processed in real time or in batch mode.

Decision tree induction is one of the most popular and important algorithms in large scale machine learning, both in batch mode and streaming mode big data systems. Parallelism is well-studied in streaming scenarios, but existing solutions are imperfect.

Streaming Parallel Decision Tree (SPDT) algorithm is ail attempt to address high data arrival rate. SPDT uses a distributed data compressed representation (histogram) computation but uses a centralized model update, which is a bottleneck. SPDT cannot scale out due to the high-cost model update computation.

Scalable Advanced Massive Online Analysis (SAMOA) is a framework for mining big data streams. SAMOA uses a Vertical Hoeffding Tree (VHT) for classification. VHT is a distributed streaming version of decision trees tailored for sparse data. SAMOA provides a distributed model update computation from one instance's point of view. SAMOA does not utilize the instance level parallelism; therefore, it cannot handle high data arrival rate. Massive Online Analysis (MOA) is an unscalable streaming decision tree, MOA uses sequential data input and model update computation.

SUMMARY

In one illustrative embodiment, a method, in a data processing system, is provided for distributed tree learning. The method comprises distributing, by a source processing instance, data record instances to a plurality of model update processing items. The method further comprises determining, by the plurality of model update processing items, candidate leaf splitting actions in a decision tree in parallel based on the data record instances. The method further comprises sending, by the plurality of model update processing items, the candidate leaf splitting actions to a plurality of conflict resolve processing items. The method further comprises identifying, by the plurality of conflict resolve processing items, conflict leaf splitting actions. The method further comprises applying, by the plurality of conflict resolve processing items, tree structure changes to the decision tree in the plurality of model update processing items.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof will best be understood by reference to the following detailed description of illustrative embodiments when read in conjunction with the accompanying drawings, wherein.

DETAILED DESCRIPTION

Real-world applications of big data stream processing present several challenges. Data arrival rate is high. For instances, global positioning system (GPS) applications consider one million GPS data instances per second in a small scale connected vehicle platform. Also, the data attribute number (feature dimension) can be large. For example, real-time text analytics consider ten thousand or more attributes. The amount of data to consider can be unbounded with data arriving twenty four hours a day and seven days a week.

The illustrative embodiments provide mechanisms for enabling horizontal decision tree learning from extremely high rate data streams. In some applications, such as connected car or vehicle-to-vehicle communication scenarios, the attribute number is not large, but the data rate is extremely high. The mechanisms of the illustrative embodiments horizontally parallelize the most computationally intensive part of decision tree learning from high data rate streams.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 1:
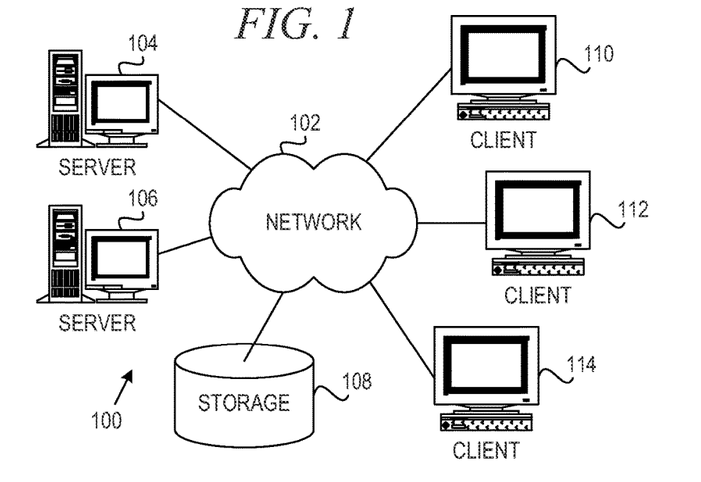
FIG. 1 is an example diagram of a multiple processor data processing system in which aspects of the illustrative embodiments may be implemented.
Figure 2:
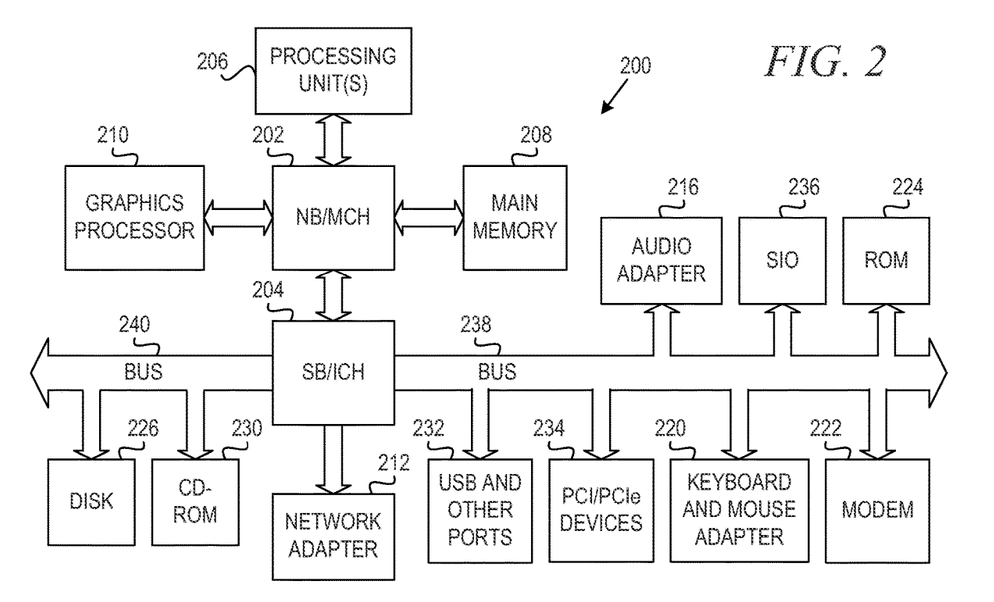
FIG. 2 is an example block diagram of a data processing system chip in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to pro vide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart, of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (RDM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or de vices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example, Essentially, data processing system 200 may be any known or later developed data processing system without architectural limitation.

Figure 3:
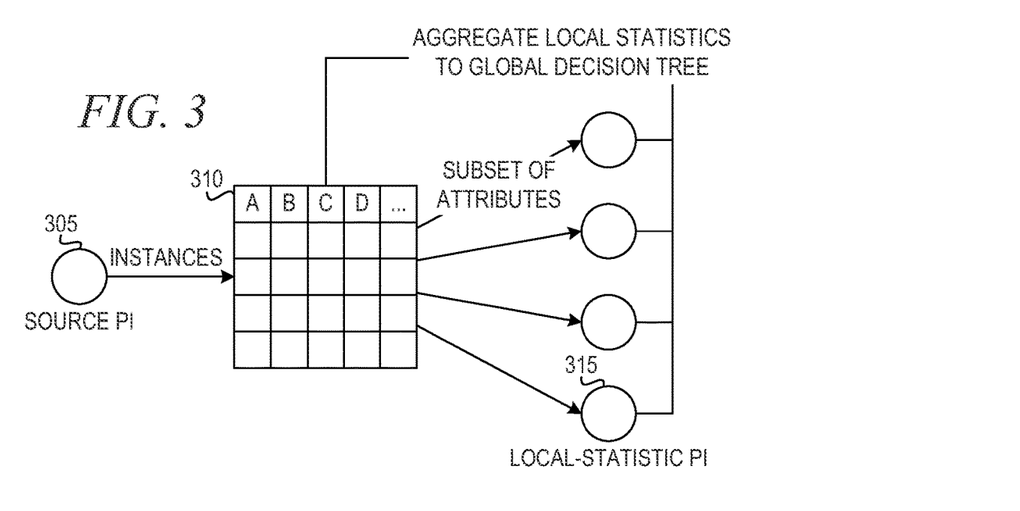
FIG. 3 depicts a mechanism for vertical parallelism for decision tree learning.

FIG. 3 depicts a mechanism for vertical parallelism for decision tree learning, Source processing item 305 receives a plurality of data instances 310. A processing item (PI) is a computer, processing node, processor, processing core, virtualized processing hardware, etc, in a distributed computing environment, such as distributed data processing system 100 in FIG. 1. Each data instance 310 includes a plurality of attributes (A, B, C, D, etc.), Vertical parallelism is achieved by distributing a subset of attributes to each of a plurality of local-statistic PIs 315. The mechanism aggregates local statistics to a global decision tree. Vertical parallelism is suitable when dimension (the number of attributes) is high. However, the parallelism level is bounded by O(#attributes) at one instance level, Vertical Hoeffding Tree (VHT) in Scalable Advanced Massive Online Analysis (SAMOA) follows this paradigm type but processes only one instance at a time.

Figure 4:
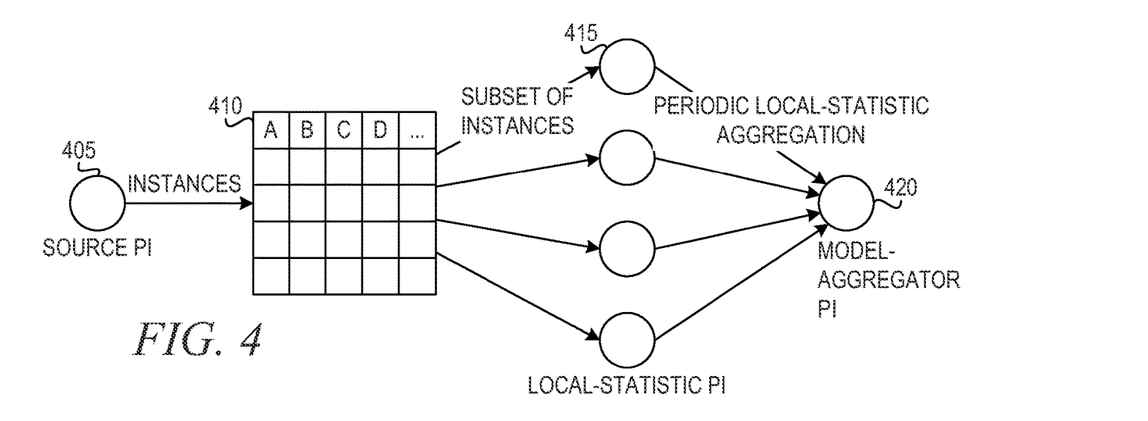
FIG. 4 depicts a mechanism for horizontal parallelism for decision tree learning.

FIG. 4 depicts a mechanism for horizontal parallelism for decision tree learning. Source PI 405 receives a plurality of data instances 410. Horizontal parallelism is achieved by distributing data instances to local statistic PIs 415, which produce local statistics for decision tree learning. Model aggregator PI 420 performs periodic local-statistic aggregation. Horizontal parallelism is suitable when data arrival rate is high. There is no bound for the parallelism level. Streaming Parallel Decision Tree (SPDT) follows this paradigm type; however, tree model learning is centralized, which restricts overall scalability.

Figure 5:
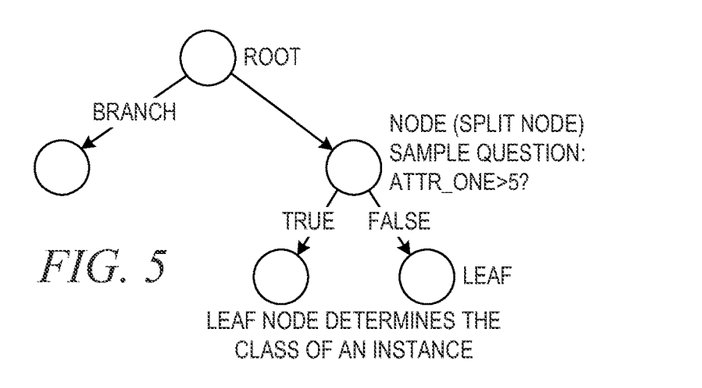
FIG. 5 shows a node split for decision tree learning.

FIG. 5 shows a node split for decision tree learning. The decision tree has a root node that branches to a plurality of child nodes. Each node branches based on the value of an attribute until the tree reaches a leaf node, which determines the class of the instance of data. A tree can be "learned" by splitting the source set into subsets based on an attribute value test. This process is repeated on each derived subset in a recursive manner called recursive partitioning. The recursion is completed when the subset at a node has all the same value of the target variable, or when splitting no longer adds value to the predictions. In the depicted example, the node splits on the sample question, ATTR_ONE>5?

Figure 6:
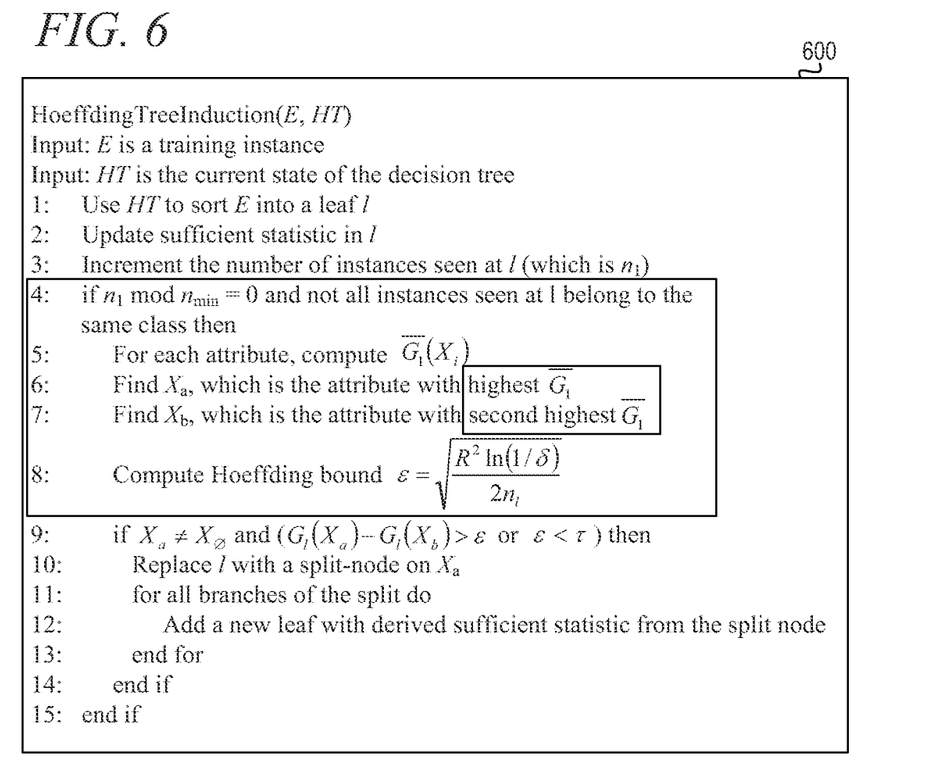
FIG. 6 depicts a typical streaming decision tree algorithm.

FIG. 6 depicts a typical streaming decision tree algorithm. The algorithm 600 is an example of Hoeffding tree induction, where E is a training instance and HT is the current state of the decision tree. In steps 4-8, for each attribute, algorithm 600 computes $\overline{G}_l/(X_l)$, which is the information gain for splitting on the attribute. In steps 6 and 7, algorithm 600 finds the attribute with the highest $\overline{G}_l$ and the attribute with the second highest $\overline{G}_l$. The portion of the algorithm 600 in steps 4-8 is the most computationally intensive part of decision tree learning.

Decision tree learning (i.e., model update of leaf node splitting) is not strictly horizontally parallelizable, because tree structure learning is typically sensitive to instance order. In SPDT, the bottleneck of centralized model update restricts the horizontal parallelism level and overall scalability. The illustrative embodiments are based on determining that instance order change in data streams may result in different tree structure, but the predictive performance may not be sensitive to the order.

In an experiment, a mechanism generates 100,000 data record instances using a random tree. The first 50,000 are training samples, and the rest are testing samples. The mechanism applies MOA to train a streaming decision tree. The mechanism denotes the performance (correct prediction percentage) by Baseline.

The mechanism then randomly assigns 50% of the instances as training samples and the rest as testing samples to retrain the streaming decision tree in a trail. The mechanism repeats five times to see if the predictive performance changes. The results are as follows: Baseline=90.19%, Trial 1=90.25%, Trial 2=90.14%, Trial 3=90.14%, Trial 4=90.28%, Trial 5=90.39%, and the average of the five trials=90.25%). The implication is that the instance order change in the data stream may result in a different tree structure, but the predictive performance is not sensitive to the order if given the "independent and identically distributed" (i.i.d.) assumption. Most of the time, predictive performance is the goal of machine learning; the model structure is not the goal. This allows the mechanisms of the illustrative embodiments to design horizontal decision tree learning from streaming data.

Figure 7A:
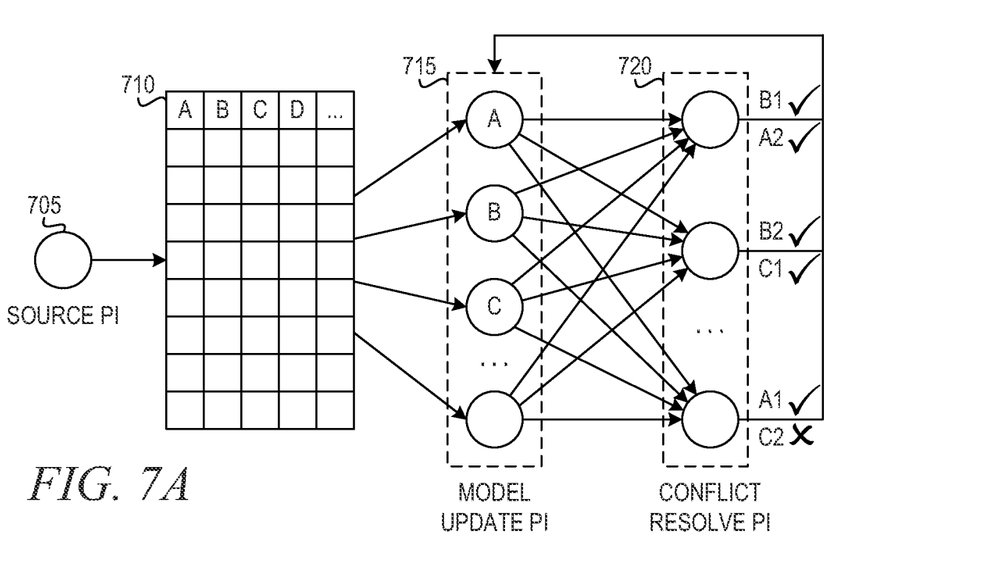
FIG. 7A depicts a mechanism for horizontal parallelism for decision tree learning with conflict resolution in accordance with an illustrative embodiment.

FIG. 7A depicts a mechanism for horizontal parallelism for decision tree learning with conflict resolution in accordance with an illustrative embodiment. Source processing item (PI) 705 receives a plurality of data instances 710. Horizontal parallelism is achieved by distributing data instances to model update PIs 715, which perform local decision tree learning. In each model update PI 715, tree learning is local. Such a concurrent learning paradigm is equivalent to applying order change to training instances. Each model update PI 715 computes information gain or other measures to obtain candidate leaf splitting actions in parallel. Each model update PI 715 determines candidate tree nodes that must be split. In one example embodiment, model update PIs 715 use a hash function to send identification of leaf nodes to conflict resolve PIs 720.

Conflict resolve PIs 720 detect conflicts. Conflict resolve PIs 720 prioritize and decide which split action to take. Conflict resolve PIs 720 mark "from_MUPI_id" of the blocked split action, Conflict resolve PIs 720 aggregate statistical information for the same leaves to ensure information consistency and applies tree changes back to model update PIs 715.

Figure 7B:
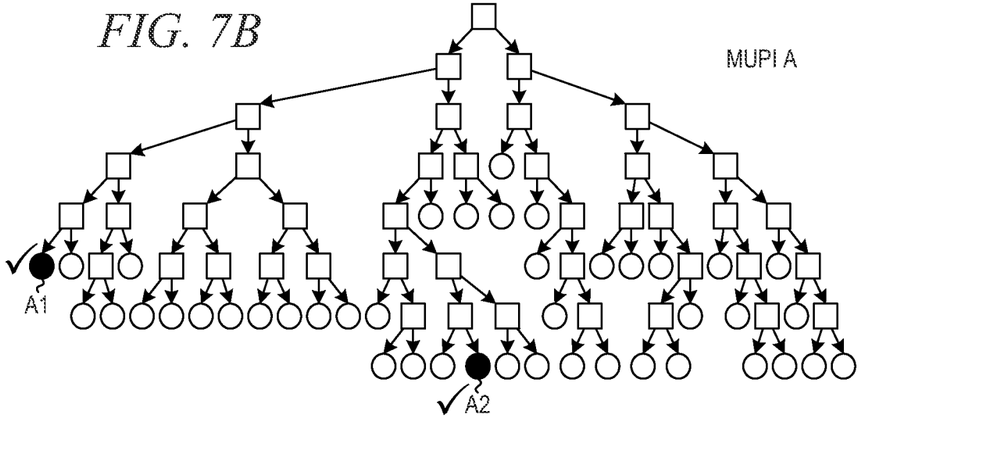
FIGS. 7B-7D show decision tree models processed by model update processing items in accordance with an illustrative embodiment.
Figure 7C:
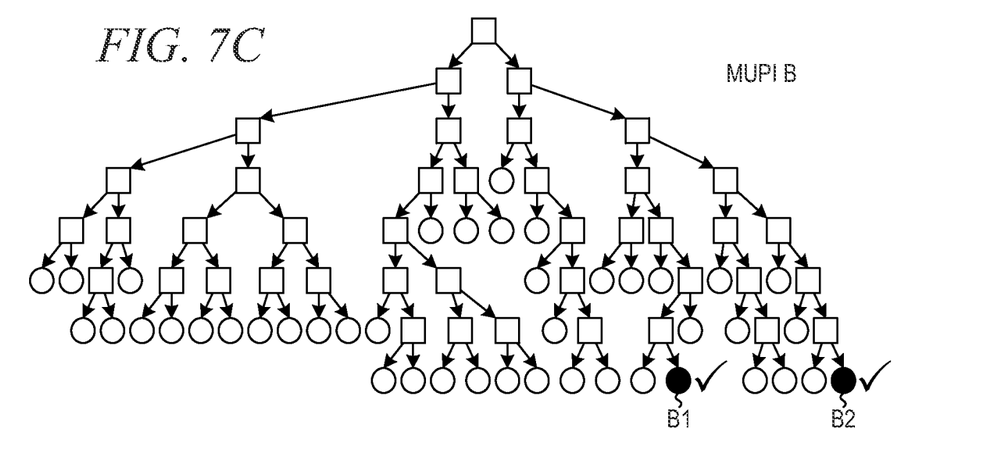
Figure 7D:
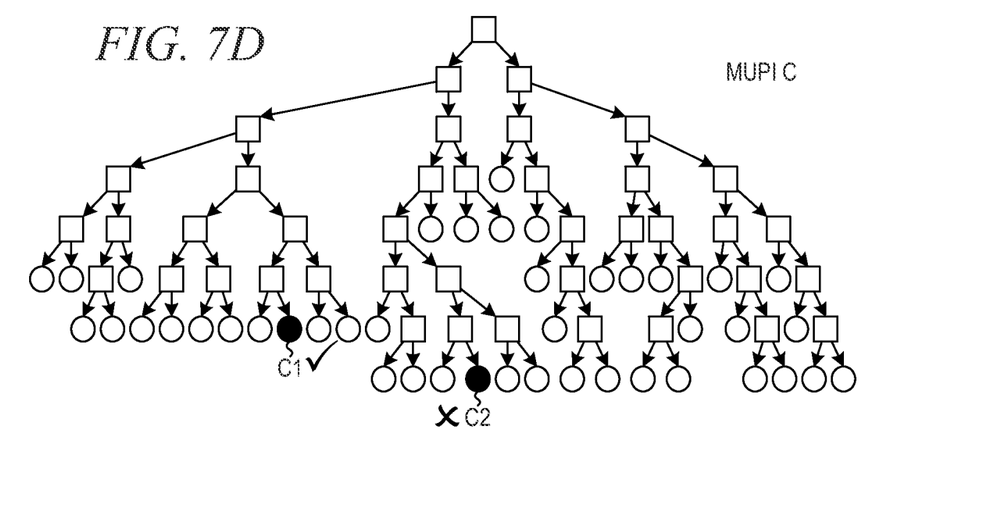

FIGS. 7B-7D show decision tree models processed by model update processing items in accordance with an illustrative embodiment. FIG. 7B shows a decision tree model processed by model update PI A; FIG. 7C shows a decision tree model processed by model update PI B; and, FIG. 7D shows a decision tree model processed by model update PI C. The decision tree model in FIG. 7B generates statistical information for leaf nodes A1, A2; the decision tree model in FIG. 7C generates statistical information for leaf nodes B1, B2; and, the decision tree model in FIG. 7D generates statistical information for leaf nodes C1, C2.

Each model update PI 715 has access to a decision tree replica or has access to the decision tree in shared memory. Model update PIs 715 perform the following function:

Map<leaf_id, (splt_attr_id, splt_point, stat_info, from_MUPI_id)> where leaf_id is the identification of a leaf node, such as A1, A2 in FIG. 7B; the splt_attr_id is the identification of an attribute causing the split; the splt_point is the attribute value at which the split occurs; the stat_info is the statistical information such as information gain; and, from_MUPI_id is the identification of the model update PI. In the depicted example, conflict resolve PIs 720 identify a conflict involving leaf node C2 and decides not to take the leaf splitting action associated with leaf node C2.

In the next round, model update PIs 715 whose identifier is the marked from_MUPI_id do not read new data but keep the old data batch to compute information gain as in normal cases. The only difference is that the nodes that are split in the last round will not accept instances in the data batch again, referred to as "closing valves" for these nodes. This is to prevent the same data from being learned multiple times at the same nodes.

As the tree grows larger, different small sets of instances become more and more improbable to fall into a same leaf node. This means that the probability of observing conflicts decreases over time. In practice, a streaming decision tree can have thousands ($10^3$ or more) of leaf nodes, but only a very small portion will be split in each cycle ($10^0 \sim 10^1$).

Figure 8:
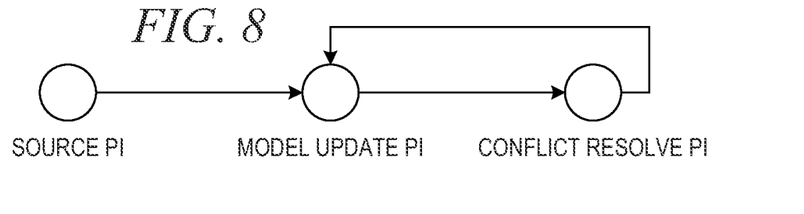
FIG. 8 depicts a logical view of horizontal parallelism for decision tree learning with conflict resolution in accordance with an illustrative embodiment.

FIG. 8 depicts a logical view of horizontal parallelism for decision tree learning with conflict resolution in accordance with an illustrative embodiment. To determine the scalability advantage, consider the following: D is the data size arrived in a unit of time, $d_i$ is the parallelism level of the model update PI, $d_c$ is the parallelism level of the conflict resolve PI, $n_{tree}$ is the number of nodes of the current decision tree, $n_{attr}$ is the number of attributes, L is the number of leaves that stat_info is changed, U is the number of leaves that are finally split for the model update, and T is the average computational time of information gain for one attribute, which can be large in practice.

The sequential computation complexity for one cycle is as follows:

$$D \cdot O(\log n_{tree}) + L \cdot n_{attr} \cdot T$$

For SPDT, the computation complexity is as follows:

$$\frac{1}{d_i} D \cdot O(\log n_{tree}) + L \cdot n_{attr} \cdot T$$

For the mechanisms of the illustrative embodiments, the worst case of the computational complexity is as follows:

$$\frac{1}{d_i}[D \cdot O(\log n_{tree}) + L \cdot n_{attr} \cdot T] + \frac{1}{d_c} O(L \cdot d_i)$$

For the mechanisms of the illustrative embodiments, the best case of the computational complexity is as follows:

$$\frac{1}{d_i}[D \cdot O(\log n_{tree}) + L \cdot n_{attr} \cdot T] + \frac{1}{d_c}O(L)$$

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area, network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent, instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 9:
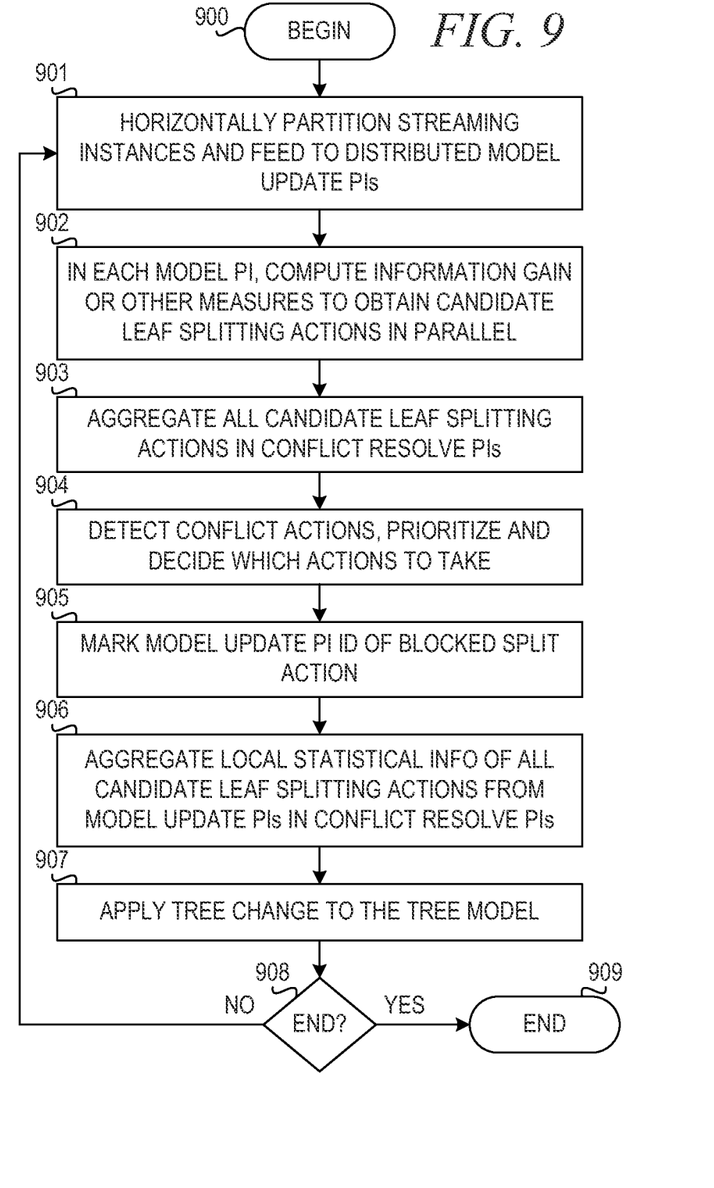
FIG. 9 is a flowchart of operation of a mechanism for horizontal parallelism for decision tree learning with conflict resolution in accordance with an illustrative embodiment.

FIG. 9 is a flowchart of operation of a mechanism for horizontal parallelism for decision tree learning with conflict resolution in accordance with an illustrative embodiment. Operation begins (block 900), and the mechanism horizontally partitions streaming instances and feeds data record instances to distributed model update processing instances (block 901). Each model update processing instance (PI) computes information gain or other measures to obtain candidate leaf splitting actions in parallel (block 902).

The mechanism aggregates all candidate leaf splitting actions in conflict resolve PIs (block 903). The conflict resolve PIs detect conflict actions, prioritizes, and decides which actions to take (block 904). The conflict resolve PIs mark the model update PI identifier (from_MUPI_id) of the blocked split action (block 905). The conflict resolve PIs aggregate local statistical information from ail candidate leaf splitting actions from model update PIs in conflict resolve PIs (block 906). The conflict resolve PIs then apply the tree change (structure and statistical information) to the tree model (block 907).

The mechanism determines whether the end of the data stream is reached (block 908). If the end of the data stream is reached, then operation ends (block 909). If the end of the data stream is not reached in block 908, then operation returns to block 901. In the next round of the data feed, the model update PIs whose identifiers are the marked from_MUPI_id do not read new data but keep the old data batch to compute information gain as in normal cases. The only difference is that the nodes that are split in the last round will not accept instance in the data batch again, referred to as "closing valves" for these nodes. This is to prevent the same data from being learned for multiple times at the same nodes.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product comprising a computer readable storage medium having a computer readable program stored therein, wherein the computer readable program, when executed on a plurality of processing items, causes the plurality of processing items to implement horizontal parallelism for distributed tree learning, wherein the computer readable program causes the plurality of processing items to:
  distribute, by a source processing item within the plurality of processing items, data record instances to a plurality of model update processing items within the plurality of processing items, wherein the plurality of model update processing items perform local decision tree learning;
  determine, by the plurality of model update processing items, candidate leaf splitting actions in a decision tree in parallel based on the data record instances;
  send, by the plurality of model update processing items, the candidate leaf splitting actions to a plurality of conflict resolve processing items within the plurality of processing items;
  identify, by the plurality of conflict resolve processing items, conflicting leaf splitting actions within the candidate leaf splitting actions in parallel;
  identify, by the plurality of conflict resolve processing items, one or more final leaf splitting actions to take based on the identified conflicting leaf splitting actions; and
  apply, by the plurality of conflict resolve processing items, tree structure changes to the decision tree in the plurality of model update processing items based on the one or more final leaf splitting actions.

2. The computer program product of claim 1, wherein determining candidate leaf splitting actions comprises computing information gain for candidate leaf splitting actions.

3. The computer program product of claim 2, wherein determining candidate leaf splitting actions further comprises determining a first attribute having a highest information gain and a second attribute having a second highest information gain.

4. The computer program product of claim 1, wherein each of the plurality of model update processing items has access to a replica of the decision tree.

5. The computer program product of claim 1, wherein each of the plurality of model update processing items has access to the decision tree in shared memory.

6. The computer program product of claim 1, wherein sending the candidate leaf splitting actions comprises sending a leaf identifier, an attribute identifier for an attribute causing a leaf split, a split point at which the leaf splits, local statistical information, and an identifier of the model update processing item.

7. The computer program product of claim 1, wherein the computer readable program causes the computing device to:
  determine, by the plurality of conflict resolve processing items for a given candidate leaf split, whether to take the given candidate leaf split or to block the given candidate leaf split.

8. The computer program product of claim 1, wherein the computer readable program causes the computing device to:
aggregate, by the plurality of conflict resolve processing items, local statistical information for each candidate leaf split from the first plurality of model update processing items.

9. The computer program product of claim 1, wherein the computer readable program causes the computing device to:
communicate, by the plurality of conflict resolve processing items, blocked candidate leaf split actions to the plurality of model update processing items.

10. The computer program product of claim 9, wherein a given model update processing item matching an identifier of a blocked candidate leaf split action does not read new data in a next cycle.

11. An apparatus comprising:
a plurality of processing items; and
a memory coupled to the plurality of processing items, wherein the memory comprises instructions which, when executed by the plurality of processing items, cause the plurality of processing items to implement horizontal parallelism for distributed tree learning, wherein the instructions cause the plurality of processing items to:
distribute, by a source processing item within the plurality of processing items, data record instances to a plurality of model update processing items within the plurality of processing items, wherein the plurality of model update processing items perform local decision tree learning;
determine, by the plurality of model update processing items, candidate leaf splitting actions in a decision tree in parallel based on the data record instances;
send, by the plurality of model update processing items, the candidate leaf splitting actions to a plurality of conflict resolve processing items within the plurality of processing items;
identify, by the plurality of conflict resolve processing items, conflicting leaf splitting actions within the candidate leaf splitting actions in parallel;
identify, by the plurality of conflict resolve processing items, one or more final leaf splitting actions to take based on the identified conflicting leaf splitting actions; and
apply, by the plurality of conflict resolve processing items, tree structure changes to the decision tree in the first plurality of model update processing items based on the one or more final leaf splitting actions.

12. The apparatus of claim 11, wherein determining candidate leaf splitting actions comprises computing information gain for candidate leaf splitting actions.

13. The apparatus of claim 12, wherein determining candidate leaf splitting actions further comprises determining a first attribute having a highest information gain and a second attribute having a second highest information gain.

14. The apparatus of claim 11, wherein each of the plurality of model update processing items has access to a replica of the decision tree.

15. The apparatus of claim 11, wherein each of the plurality of model update processing items has access to the decision tree in shared memory.

16. The apparatus of claim 11, wherein sending the candidate leaf splitting actions comprises sending a leaf identifier, an attribute identifier for an attribute causing a leaf split, a split point at which the leaf splits, local statistical information, and an identifier of the model update processing item.

17. The apparatus of claim 11, wherein the instructions further cause the plurality of processing items to:
determine, by the plurality of conflict resolve processing items for a given candidate leaf split, whether to take the given candidate leaf split or to block the given candidate leaf split.

18. The apparatus of claim 11, wherein the instructions further cause the plurality of processing items to:
aggregate, by the plurality of conflict resolve processing items, local statistical information for each candidate leaf split from the first plurality of model update processing items.

19. The apparatus of claim 11, wherein the instructions further cause the plurality of processing items to:
communicate, by the plurality of conflict resolve processing items, blocked candidate leaf split actions to the plurality of model update processing items.

20. The apparatus of claim 19, wherein a given model update processing item matching an identifier of a blocked candidate leaf split action does not read new data in a next cycle.

* * * * *